D. H. Chamberlain.
Hand Stamp.

No. 2847. Reissued Jan. 21. 1868.

Witnesses.

J. H. Adams

C. H. Smith.

Inventor.

Dexter H. Chamberlain

United States Patent Office.

E. D. CHAMBERLAIN, OF WESTFIELD, NEW JERSEY, AND CHARLES H. BROWN, OF NEW YORK, N. Y., ASSIGNEES OF DEXTER H. CHAMBERLAIN.

*Letters Patent No.* 61,396, *dated January* 22, 1867; *reissue No.* 2,847, *dated January* 21, 1868.

IMPROVEMENT IN HAND-STAMPS.

The Schedule referred to in these Letters Patent and making part of the same.

TO ALL WHOM IT MAY CONCERN:

Be it known that DEXTER H. CHAMBERLAIN, of West Roxbury, Massachusetts, invented a new and improved Hand-Stamp; and we do hereby declare that the following is a full, clear, and exact description thereof, which will enable others skilled in the art to make and use the same, reference being had to the accompanying drawings, forming part of this specification.

Figure 1:
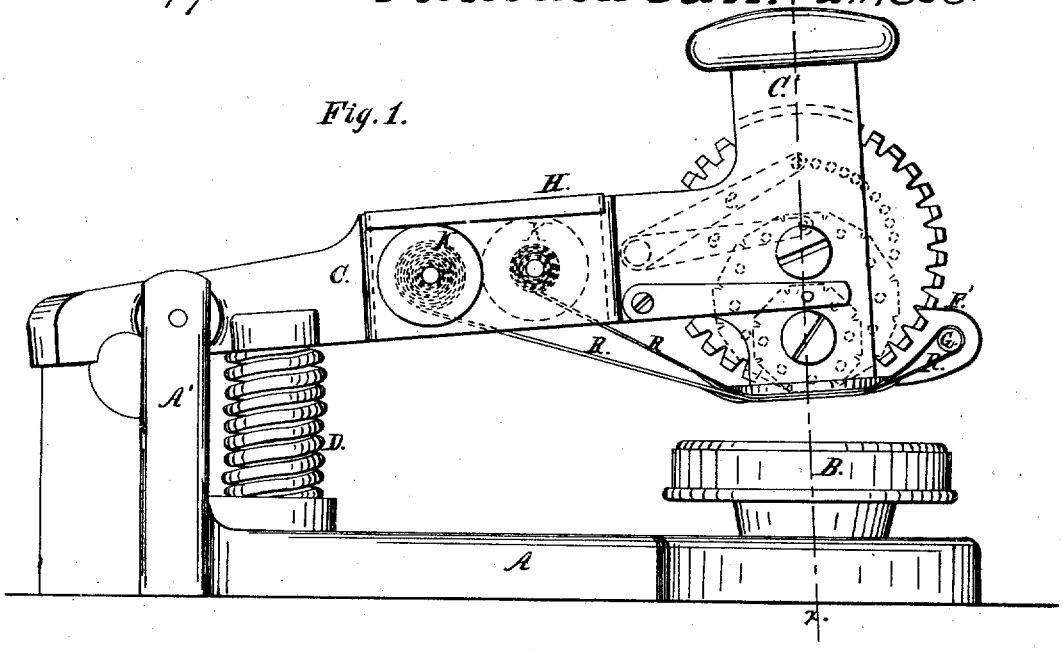

Figure 1 represents a side elevation.

Figure 2:
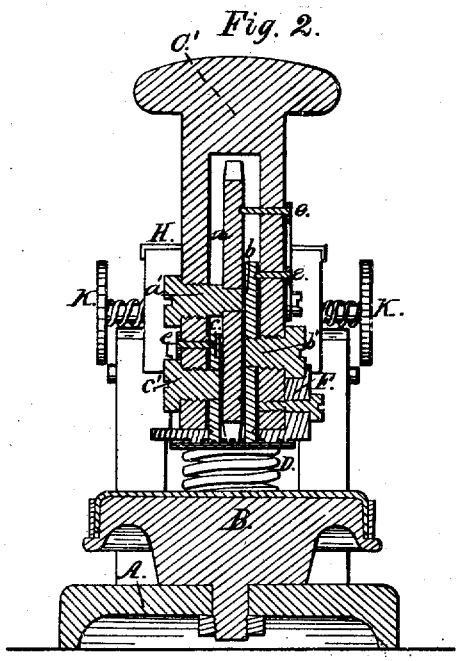

Figure 2, a vertical cross-section through the line *x x* of fig. 1.

Figure 3:
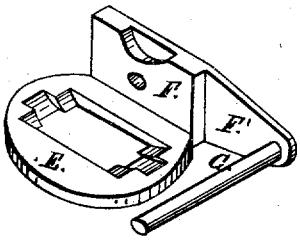

Figure 3, a perspective view of the die-holder, with the plate and stud-pin which carries the fold of the ribbon.

The object of this invention is to simplify the construction of the cancelling-stamp, and bring within a small compass the operative parts, so that they can be used and adjusted with facility and certainty.

The invention consists in the employment of type-wheels of different diameters, in combination with a die perforated so as to admit of the impression from said wheels being made in the smallest possible space, which advantage is attained by placing the smaller type-wheels on either side of the larger one, said small wheels requiring a shorter arc or curve in the die-plate, and thereby admitting of the use of an oval or round die of smaller size upon the under side of the die-plate than could be used if the wheels were all as large as the largest one.

The largest wheel is that for printing the days of the month. There being thirty-one days, the size of the wheel is necessarily large. The other wheels, for the months and years, either or both, may obviously be made very much smaller.

Also devices for securing the die to the lever beneath the wheels used, and disposing of the inking-ribbon in an improved, compact, and convenient manner, together with other devices, tending to simplify and perfect the whole.

Referring to the drawings, A represents the base of the device, having at its rear an upright or standard, A′, to which is pivoted the lever or arm *c c′*, carrying the type-wheels, and rollers upon which the inking-ribbon is wound. The said lever is held slightly elevated by means of a spring, D, forward of the upright A′. On the front end of the base, A, is a cushion, B, of the usual construction. The front end of the lever C′ is elongated vertically, and contains the type-wheels, working in an opening in the said elongated end of the lever. The type-wheels *a b c* have letters and figures around their periphery for indicating the full date. *a* is a large wheel, the periphery of which is formed into a series of teeth, having on their outer faces, figures to designate the day of the month. The axis of this is formed on the reduced end of a set-screw, *a′*, fig. 2, and does not pass beyond the opposite face of said wheel, thereby allowing the contiguous wheel *b* to revolve. The wheel *b* is of smaller diameter than the wheel *a*, and is formed with twelve sides or faces, upon which are the names of the months. It is mounted upon an axis, *b′*, formed on a set-screw placed in the opposite side of the vertical portion of the lever *c c′*, similarly to the axis *a′* above described. *c* represents a still smaller wheel, and is formed with sides or faces, on which are marked a series of years. It is mounted on an axis, *c′*, in a similar manner to the wheels *a* and *b*. It will thus be seen that, by constructing the wheels of different diameters, and arranging them to rotate on separate and independent axes, they may be very readily adjusted, and the space required for marking the day, month, and year may be very small. To the lower part of the part or elongated end *c′* of the lever, is secured the die-holder E, shown in fig. 3, which may have on its under side any required impression. It is attached to and forms a part of the flange F, which fits upon one side of the lower part of the lever *c′*, and is secured to its place thereon by means of a screw, so that it is readily detached if required. The plate E is provided with an opening adapted to receive the several faces of the type-wheels, and admit of their making their impressions upon the article to be stamped, as before described. Extending forward from the flange F, is a projection, F′, bearing upon its outer end a cylindrical pin or stud, G, which passes transversely across the front, *c′*, of the lever C, a little above the level of the die-block E, for a purpose hereinafter explained. In the central portion of the lever C, is formed an oblong or square cavity, open at the upper and lower faces of the said lever C, the upper side being provided with a movable cover, H. Within this opening are arranged two transverse reels or rollers, upon which is wound the inking-ribbon R. The said ribbon being properly saturated with the inking-material, is wound first upon one of the reels, and passes down underneath the die-block, over the previously-described pin or stud G, thence returning under and in contact with the die-block to the other reel, thus forming a double thickness of the inking-ribbon between the die-block and the article to be stamped.

By this means, an increased supply of ink is furnished to the types, causing a more distinct and sure impression than that made by a single ribbon, rendering it also much more durable than a single ribbon.

The ribbon is wound from one reel to the other, as occasion requires, by means of the handles K, fig. 2.

The inking-ribbon as heretofore used, with lever hand-stamps, was disconnected with the lever, and required additional parts to hold and operate its rollers, thus making a more expensive and complicated construction.

Our improved method of attaching the inking-ribbon, with its rollers, to the lever, placing the rollers within the lever, as above shown, simplifies this part of the hand-stamp, and, thus arranged, it is more easily operated, and less in the way than those otherwise attached to lever-stamps.

The advantages of these improvements, taken collectively, consist in the facility with which the hand-stamp can be used, together with the simplicity and compactness of the whole.

We claim as new, and desire to secure by Letters Patent—

1. The combination, with a die in a hand-stamp, of type-wheels of different diameters, substantially as and for the purpose specified.

2. The die-holder E, constructed and combined with the lever-end C, substantially as and for the purpose shown and described.

3. Making the type-wheels *a b c* of different diameter, rotating upon separate and distinct axes, *a′ b′ c′*, substantially as and for the purpose shown and described.

4. The combination of the inking-ribbon with the type-wheels, substantially as herein described, so as to present a double fold of the ribbon under the type-wheels, all as set forth.

E. D. CHAMBERLAIN,
CHAS. H. BROWN.

Witnesses:
WM. F. MCNAMARA,
ALEX. F. ROBERTS.